Dec. 7, 1937.    L. BELLINGHAM ET AL    2,101,728
PRISM COMBINATION FOR THREE COLOR PHOTOGRAPHY AND CINEMATOGRAPHY
Filed Feb. 8, 1937

INVENTORS
Leonard Bellingham
Frank Stanley
Gilbert Frank Stanley
Strauch & Hoffman
ATTORNEYS Patented Dec. 7, 1937

2,101,728

UNITED STATES PATENT OFFICE 2,101,728

PRISM COMBINATION FOR THREE COLOR PHOTOGRAPHY AND CINEMATOGRAPHY

Leonard Bellingham, Frank Stanley, and Gilbert Frank Stanley, London, England

Application February 8, 1937, Serial No. 124,768
In Great Britain April 15, 1935

6 Claims. (Cl. 88—1)

The present invention relates to optical prisms for three color photography and cinematography, and aims to provide such a prism system giving three juxtaposed images of exactly equal size and of substantially equal intensity or of any desired relative intensities.

It is well known that in the case of prism systems for color photography considerable difficulty always arises in equalizing the lengths of the paths through glass of the several component color beams and this invention has been devised to enable this result to be obtained in the case of three color images formed adjacent to one another, either side by side, or one above the other, whilst at the same time the wide angle of view is obtained, which is necessary for cinematography.

In the improved prism system according to the present invention there are two successively acting partially reflecting and transmitting surfaces for dividing out two of the component beams from each other and from the third component beam, and three internally reflecting surfaces adapted totally to reflect the divided component beams in the required direction, parallel to one another, said totally reflecting surfaces being spaced from the exit face of the combination at distances which equalize the lengths of the paths through glass of the several component color beams.

According to an important feature of the invention, two of said totally reflecting surfaces are spaced at equal distances from the exit face of the combination, and the third totally reflecting surface is spaced inwardly to a greater extent from the exit face of the combination. Preferably, the first two reflecting surfaces are spaced apart from one another and the third reflecting surface is located opposite to the space between the first two reflecting surfaces, so as to project through said space.

The various features of the invention are hereinafter defined in the claims appended hereto and forming part of this specification.

The invention is illustrated by way of example only in the accompanying drawing, in which:—

Figure 1:
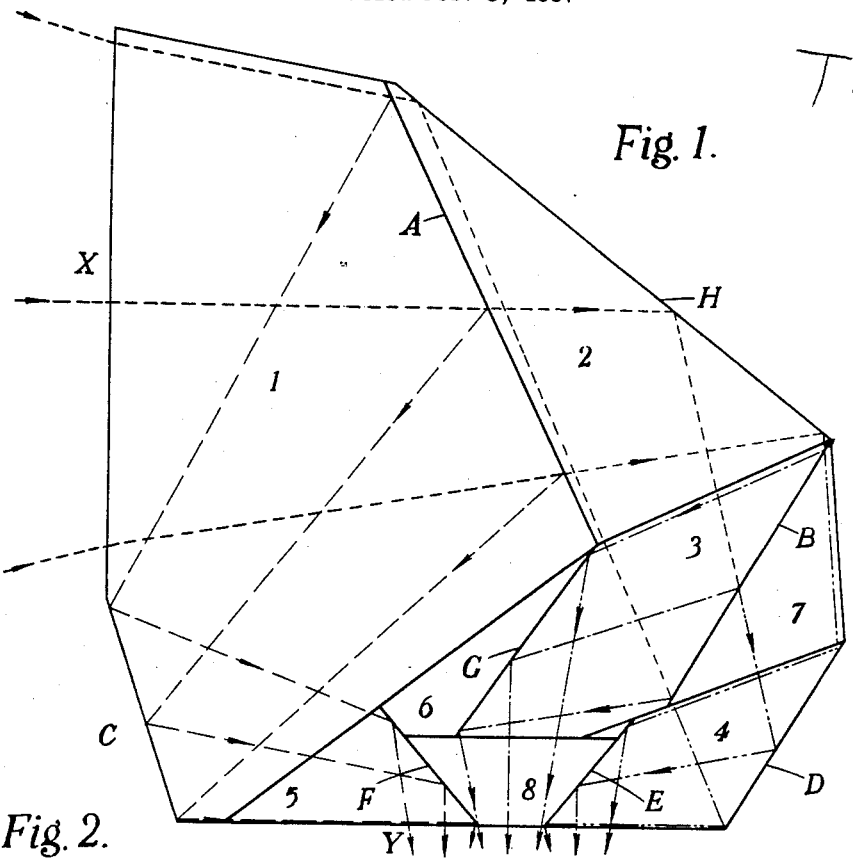
Figure 2:
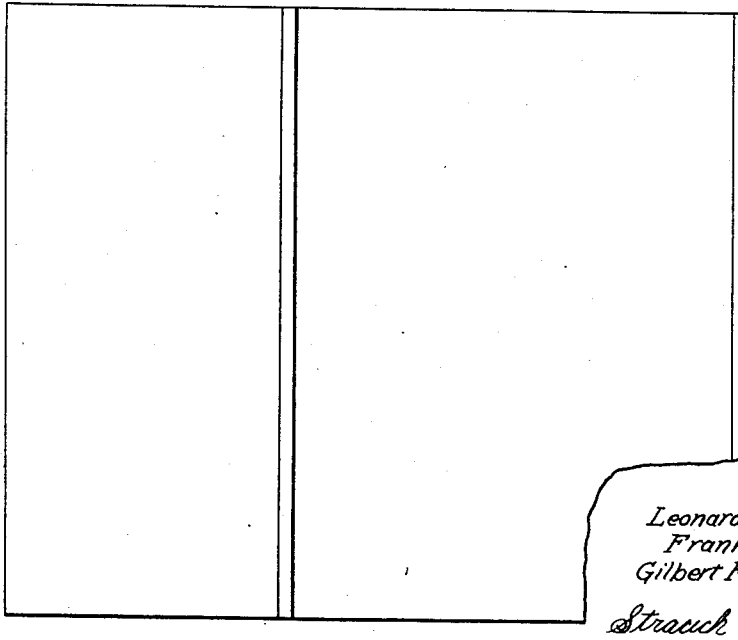

Fig. 1 is a side elevational view of a prism combination in accordance with the invention, and Fig. 2 is a plan view of the combination.

As shown in the drawing, the prism system is compounded of eight prism elements 1–8, and has seven external faces. The entrance member 1 is an irregular six sided prism, having four outer faces and two internal faces. The inclined internal face A opposite to the entrance face X is partially coated with metal and arranged, so as to reflect a portion of the incident beam and transmit the remainder, and a totally reflecting outer surface C, opposite to the partially reflecting surface A and adjacent to the entrance wall X, deflects the reflected component beam internally and out of another internal face of the prism member 1, through one internal wall of an adjacent triangular prism 5, to an opposite totally reflecting internal wall F which deflects the component beam again in the required direction out of the combination through the third and outer wall of the triangular prism 5.

After passing through the partially reflecting internal surface of the entrance member, the beam, now reduced in intensity, enters an adjacent triangular prism 2, is deflected internally by the totally reflecting outer wall H thereof through the third internal wall of the prism 2, and enters an adjacent internal prism 3 to strike another partially reflecting and partially transmitting internal surface B which is partially metal coated and arranged to transmit part of the beam and reflect the remainder. The transmitted component beam passes through an adjacent triangular prism 7, enters an adjacently disposed prism 4, and is deflected by an outer totally reflecting wall D thereof to an opposite totally reflecting inner wall E by which it is finally deflected out of the prism combination, the fourth outer wall of the prism lying in the same plane as the outer wall of the triangular prism 5 through which the first beam component is projected. The two reflecting surfaces E and F of the prism 4, and triangular prism 5 respectively are spaced apart by a prism 8, and are inclined at equal but opposite angles to the exit face Y of the combination which is built up, at right angles to the entrance face of the combination, by the triangular reflecting prism 5 of the first component beam, the reflecting prism 4 of the second component beam, and the intervening trapezoidal prism 8.

The third component beam reflected by the internal partially reflecting prism 3 strikes a totally reflecting internal opposite wall G thereof, and is deflected thereby, out of the exit face Y of the combination, through the trapezoidal prism member 8 located between the wall of the prism 5 and prism 4 reflecting the first two beam components out of the combination. Thus the third beam component emerges from the combination between the first two beam components.

Any spaces existing between the members of the combination when assembled in correct optical relation are filled in with glass members of suitable shape, which are optically inactive in the combination, but serve as distance pieces to retain the optically active members in correct relation. The members 6, 7, 8 are examples of such filling pieces.

The various components of the compound prism are assembled and cemented together to form a solid block of irregular polygonal shape, the entrance face X and the exit face Y lying in planes at right angles to one another.

The proportions and angles of the various members of the combination are such that the emergent beam components reflected by the three final reflecting surfaces are parallel to one another, and are also such that the mean paths of the beam components between the entrance and exit walls of the combination are equal.

We claim:—

1. A three color prism combination for color photography and cinematography comprising a multiplicity of prism members cemented together to provide a composite prism having an entrance face and an exit face disposed at right angles to one another and including two successively acting partially reflecting and partially transmitting surfaces disposed in the angle formed between said faces for dividing a beam entering said entrance face into three component beams; three totally reflecting surfaces for deflecting said beams toward said exit face, and three totally reflecting surfaces disposed in the angle formed between said faces, each of said second mentioned totally reflecting surfaces being located in the path of one of said component beams for deflecting its component beam outwardly through the exit face in a direction parallel to the entrance face in the required manner, said second mentioned three totally reflecting surfaces being disposed inwardly of said exit face and one of said totally reflecting surfaces being disposed farther inwardly with respect to said exit face than said other two reflecting surfaces to equalize the length of the component beams through the glass of the combination.

2. A three color prism combination for color photography and cinematography comprising a plurality of prism members cemented together to provide a composite prism having an entrance face and exit face disposed in planes normal to one another and including two successively acting partially reflecting and partially transmitting surfaces for dividing a beam entering the composite prism into three separate components, a totally reflecting surface in the path of each beam component for directing said beam component toward the exit face, two totally reflecting surfaces spaced laterally apart from one another and in the path of two of said directed beam components for receiving and deflecting said two beam components out of said exit face in a direction normal to said face and providing a gap therebetween, and a third totally reflecting surface located opposite said gap for receiving and deflecting the third component beam out of said exit face between said two beam components in a direction normal to said face, said two totally reflecting surfaces being located equi-distant from said exit face and said third totally reflecting surface being spaced inwardly from said exit face and said two totally reflecting surfaces a distance sufficient to equalize the lengths of the paths of the component beams through the glass of the composite prism.

3. A three color beam dividing prism combination for color photography and cinematography comprising a seven sided composite prism having an entrance face and an exit face disposed at right angles to one another, two partially reflecting faces disposed interiorly of said prism for dividing a beam entering said entrance face into three component beams, three totally reflecting external faces located in the paths of said component beams for deflecting said component beams toward the interior of said composite prism and three internal totally reflecting surfaces located in the path of said deflected component beams for deflecting said component beams through said exit face in a direction parallel to said entrance face whereby said component beams emerge from said exit face in parallel spaced relation to one another.

4. The combination defined in claim 3 wherein said last mentioned totally reflecting surfaces are located adjacent said exit face with two of said surfaces equidistant from said exit face and laterally spaced from one another and with the third surface disposed between said two surfaces and off-set inwardly from said exit face and said two surfaces whereby the length of the paths of said component beams through the glass of said composite prism are equal.

5. A three color prism combination for color photography and cinematography comprising a plurality of prism members cemented together to form a composite prism having entrance and exit faces and including an entrance member in the form of an irregular six-sided prism having an entrance face, a partially reflecting inclined face opposite said entrance face for dividing a beam entering the composite prism through said entrance face into a reflected beam and a transmitted beam and an inclined totally reflecting face adjacent said entrance face and opposite said partially reflecting inclined face for deflecting said reflected beam inwardly of said composite prism; a triangular prism disposed upon the partially reflecting face of the six-sided prism and having a totally reflecting face for deflecting said transmitted beam inwardly of said composite prism; a prism located to receive the beam reflected by said triangular prism and having a partially reflecting face for dividing said beam into two components and a totally reflecting face spaced a predetermined distance inwardly from said exit face and opposite said partially reflecting face for deflecting said second reflected beam outwardly of said composite prism; an external totally reflecting surface for deflecting said last mentioned transmitted beam inwardly of said composite prism; and two interior reflecting surfaces for receiving and reflecting the first mentioned reflected beam and the last mentioned transmitted beams out of said exit face in the required direction, said predeterminedly spaced totally reflecting surface being disposed inwardly of said exit face a greater distance than the said two totally reflecting surfaces to equalize the lengths of the paths of the component beams through said composite prism.

6. A three color prism combination for color photography and cinematography comprising a composite prism having a six-sided entrance prism including a flat entrance face of substantial length, an inclined partially reflecting surface opposite said entrance face for dividing an entrance beam into a reflected component and a transmitted component, a totally reflecting external surface adjacent said entrance face and opposite said partially reflecting surface in the path of said reflected component for deflecting said component away from said partially reflecting surface and inwardly of said composite prism; a second prism disposed on said partially reflecting surface and having a totally reflecting surface located opposite said partially reflecting surface in the path of said transmitted component beam for deflecting said component beam away from said partially reflecting surface and inwardly of said composite prism; a third prism disposed in the path of said deflected transmitted beam and including a partially reflecting surface for dividing said deflected transmitted component beam into a reflected beam and a transmitted beam, and a totally reflecting surface located opposite said second mentioned partially reflecting surface in the path of said second reflected beam and interiorly of said composite prism for deflecting said beam outwardly of said composite prism in a direction substantially parallel to said entrance face; a fourth prism located in the path of said second transmitted beam and having a totally reflecting surface for deflecting said beam inwardly of said composite prism and a totally reflecting surface disposed in the path of said second deflected transmitted beam for deflecting said beam outwardly of said composite prism in a direction substantially parallel to said entrance face; a fifth prism disposed in the path of said first mentioned deflected reflected beam and having a totally reflecting surface for deflecting said beam outwardly of said composite prism in a direction substantially parallel to said entrance face; a sixth prism disposed in the path of said second deflected reflected beam and having an external face lying in a plane normal to said entrance face to form a portion of an exit face; and external faces formed on said fourth prism and said fifth prism in the path of the beams deflected therethrough and in alignment with said external face of said sixth prism to form a continuous exit face normal to said entrance face, said prisms and said reflecting surfaces being so arranged that the lengths of the paths of said component beams through the glass of said composite prism will be equal and so that the beams will emerge from said continuous normal exit face in parallel relation to one another.

LEONARD BELLINGHAM.
FRANK STANLEY.
GILBERT FRANK STANLEY.